Feb. 3, 1931.  P. GERLI  1,791,305
HYDROAIRPLANE STATION
Filed July 7, 1927  2 Sheets-Sheet 1
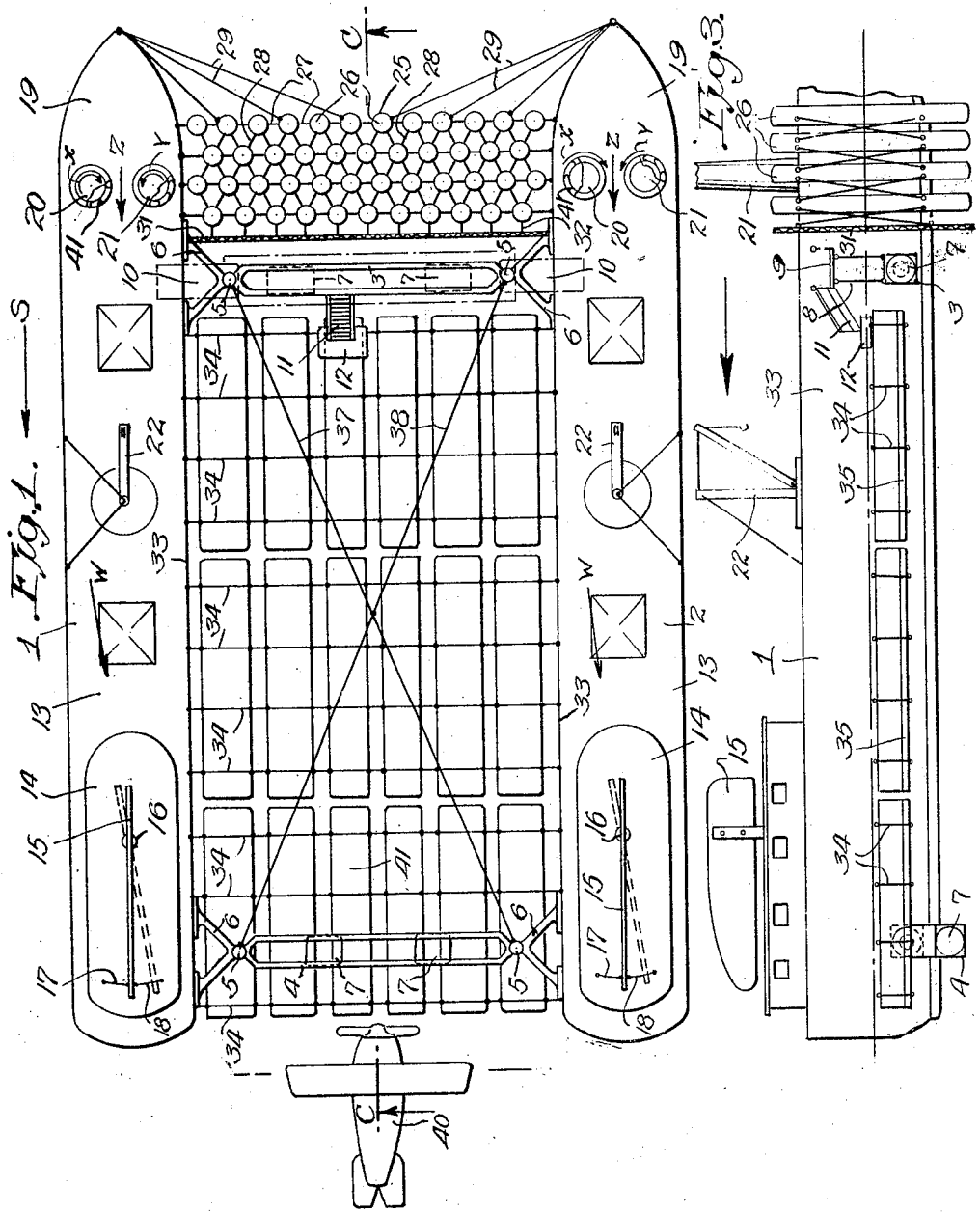
INVENTOR
Paul Gerli

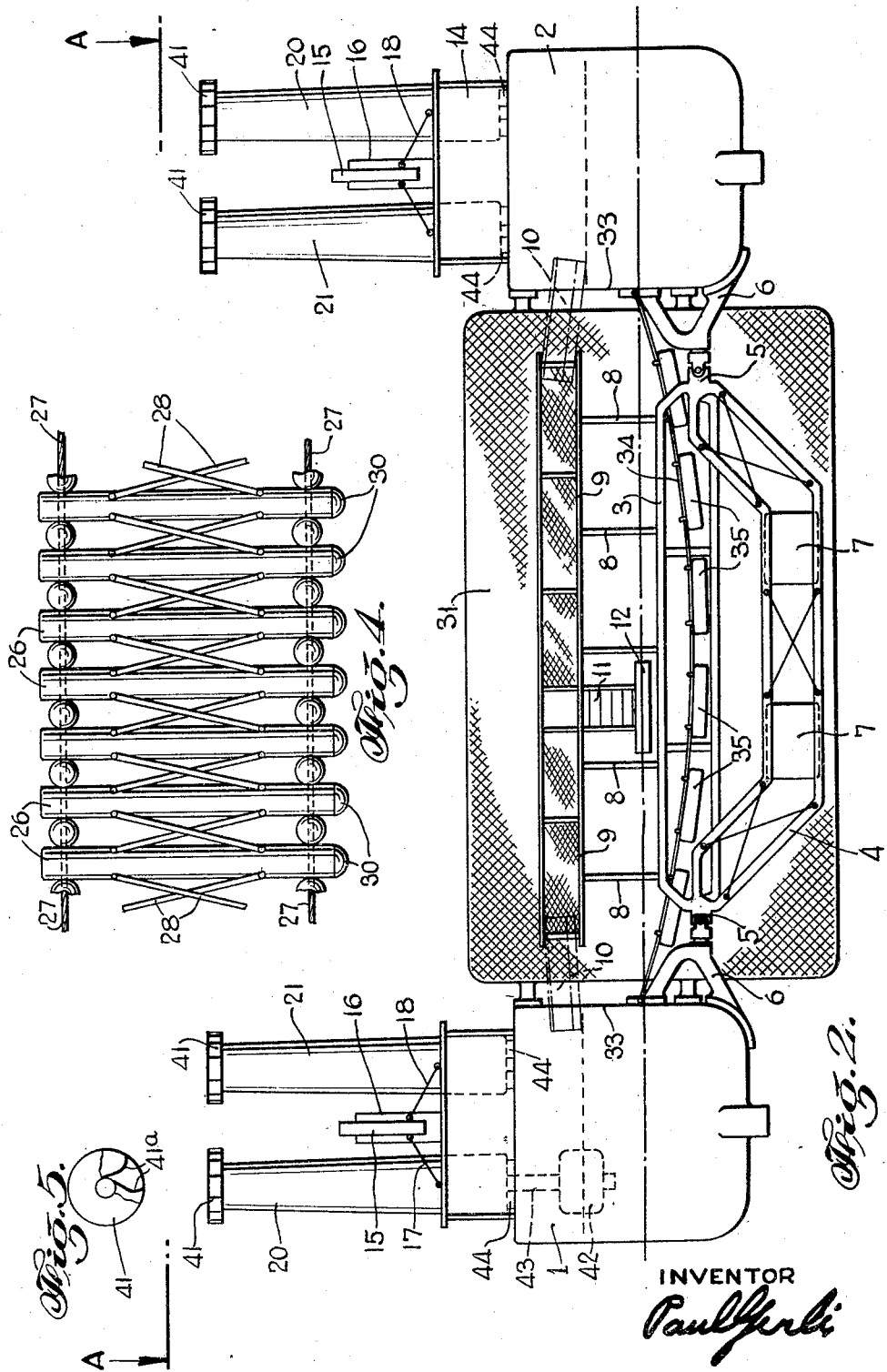

Patented Feb. 3, 1931

1,791,305

UNITED STATES PATENT OFFICE

PAUL GERLI, OF NEW YORK, N. Y.

HYDROAIRPLANE STATION

Application filed July 7, 1927. Serial No. 204,006.

This invention relates to airplane stations, and more particularly to floating hydro-airplane stations for trans-oceanic transportation of hydro-airplanes.

The principal object of my invention is to furnish a station of low structural cost, at the same time furnishing a safe harbor for hydro-airplanes and passengers enroute.

Another object is to furnish novel wind operated propelling means for compensating for the "drift" of the station and wherein the wind causing the drift will be caused to actuate the propelling means.

Another object is to furnish novel means for heading the station into the roll of the sea irrespective of the direction of the wind blowing over the sea.

Other objects and advantages will appear as the description of the invention progresses, and the novel feature of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the device, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and in which:—

Figure 1 is a top plan view of a preferred form of station taken in line A—A of Fig. 2, and Fig. 2 is a rear elevational view of the same taken on line B—B of Fig. 1, and Fig. 3 is a part sectional, part elevational view taken on line C—C of Fig. 1, and Fig. 4 is a detailed view of the "breakwater" forming part of the station, and Fig. 5, is a part plan, part sectional views of a wind motor.

Referring to Fig. 1, hulls 1 and 2 are held in spaced relation by fabricated transverse members, 3 and 4, at each end of which is secured a universal joint as 5—5, said joint forming a universal connection to brackets as 6—6 rigidly secured to the sides of hulls, 1 and 2. Suitably mounted within members 3 and 4 are pontoons as 7—7 of sufficient size to cause said members to be semi-floating.

Supported by stanchion 8—8 secured to members 3, is passenger landing platform 9, movably resting on each end of which are gangways 10—10 leading to the interior of hulls 1 and 2. A suitable hinged stairway as 11, and float 12, permit passengers and crew to land from small boats onto the platform 9.

On the decks 13, of hulls 1 and 2, are erected suitable store or work houses 14—14, on which are mounted vanes or rudders 15—15 pivoted at 16—16 and adapted to be actuated by cable 17—17 and 18—18.

Adjacent the bows 19—19 of hulls 1 and 2 are wind rotors 20—20 and 21—21.

Located substantially mid-ship hulls 1 and 2 are derricks 22—22 adapted to raise airplane and supplies to the decks 13—13 of said hulls.

Arranged between hulls 1 and 2, and forward of members 3, is the breakwater 25, comprising in part spiles or semi-floating members 26—26, suitably linked together by cables, or link members 27—27 and 28—28, serving to hold spiles 26—26 in a uniform but yielding unit as 25, suitable cables, as 29—29 being attached to spiles 26—26, and the bow 19, to hold breakwater 25 in proper location. If desired a weight as 30 may be employed to adjust buoyancy whereby spiles 26—26 will inherently float with the required exposed and submerged portions as shown.

Also forming part of breakwater 25 is flexible screen or lattice member 31, each end of which is secured to hulls 1 and 2 and the mid portion to spiles 26—26 by cables or links 32—32.

Secured to the sides 33—33 of hulls 1 and 2 and stretched therebetween are cables 34—34 secured to which are semi-floating floor members or pontoons 35—35, acting as a submerged floor.

Secured to the diagonally opposed brackets 6—6 are trussing cables or links 37 and 38 acting to hold hulls 1 and 2 in the longitudinal relation.

A hydro-plane as 40 is shown entering this lagoon 41.

In practice the hulls 1 and 2 are made up as separate units and the various other portions, when completed, are stored in the holds or on the decks of said hulls, whereafter said hulls are towed to destination. Thereafter the members 3 and 4 are secured in place with universal joints as 5—5 and the other portions as platform 9, floor 35 and breakwater 25, are erected to place to obtain a complete station as shown in Figs. 1, 2 and 3.

Wind rotors 20 and 21 supported by thrust bearings 44—44 are suitably revolved by power motors as 42, through the shaft 43, or by wind motors as 41 having blades, as 41a—41a. Rotors 20—20 rotate clock-wise in direction of arrows X—X, and rotors 21—21 counter clockwise in direction of arrows Y—Y. By thus rotating said rotors a strong current of air is developed in the direction of arrows Z—Z, thereby tending to drive or propel hulls 1 and 2 forward, this propelling power being proportional to the speed of rotors 20—20 and 21—21. Said rotors are preferably equipped with wind motors, as 41—41, which act to keep the rotors revolving, thereby partially, or entirely eliminating the use of power consuming motors as 42, said last named motors being employed only when the wind is insufficient to drive the rotors by motors 41—41. It is to be noted that by the reversed rotation of the rotors, as 20 and 21, a wind striking hulls 1 and 2, on the beam, or side, will cause said hulls to quickly head into said wind with the bows 19—19 facing thereto. Due to the taper of the rotors 20 and 21, the wind striking said rotors will be inclined upwardly thereon, in this manner forming a longer path for the wind whereby increased propelling power is obtained. This upward movement of the air currents further tends to stabalize the rolling, or pitching of the hulls, as 1 and 2.

As a means for holding the hulls 1 and 2 headed into the waves, or breakers, although the wind may be from a different direction than the swell, or roll of the seat, I provide vanes, or rudders as 15—15, which may be adjusted by cables 17—17 and 18—18. Assuming the wind to be in the direction of arrow W, and the swell of the sea to be in the direction of arrow S, the rudders 15—15 would be moved to the dotted position shown in Fig. 1, and under which condition the hulls 1 and 2, would remain headed into the swell of the sea although the wind was not running in a like direction. It is to be noted that irrespective of the angularity of a forward, or head on wind, as W, the rotors 20—20 and 21—21, will, due to their opposite direction, always produce a propelling power in the direction of arrow Z.

Hulls 1 and 2, are also provided with a suitable power plant and propellers (not shown) for propelling the said hulls independently of the wind rotors 20 and 21.

Hulls 1 and 2, are also provided with suitable revolving searchlights, (not shown) for directing the air-plane pilots. Also with suitable sirens, or fog horns (not shown) for further directing of said pilots during fogs or for emergency directing purposes.

Hulls 1 and 2, are also provided with living quarters whereby the passengers and airplane crews may remain aboard said hulls for protracted periods if so required.

Hulls 1 and 2 are also provided with suitable wireless, or radio apparatus for receiving messages and for directing airplanes enroute.

What I claim is:

1. A hydro-airplane station, in combination; a plurality of buoyant hulls, submerged spacing members holding the hulls in spaced relation, buoyant members supported thereby, universally jointed members joining the hulls and the spaced relation members whereby one of the hulls may rock, or roll transversely and longitudinally independently of the other hull.

2. A hydro-airplane station comprising in combination; a plurality of buoyant hulls, spacing members holding the hulls in spaced relation, universally jointed members joining the hulls and the spacing members whereby one of the hulls may be moved on a fore and after axis thereof forwardly or rearwardly of the other hull, and members supported by the station for restraining the hulls to remain in one relative fore and aft position whereby their prows remain substantially abreast of each other.

3. A hydro-airplane station, in combination; a plurality of buoyant hulls, means holding the hulls in spaced relation to each other, universal means joining the hulls and the spaced relation means whereby one of the hulls may have universal movement with respect to the other hull except as to spaced relation and a breakwater secured to the hulls and interposed in the space therebetween.

4. A hydro-airplane station for transoceanic travel by airplane, in combination; a plurality of buoyant hulls, means flexibly holding the hulls in spaced relation to each other, a breakwater secured to and interposed between the hulls in a manner to form a lagoon shielded on substantially three sides, and a submerged floor secured to and interposed between the hulls in a manner to form a floor for the lagoon.

5. A hydro-airplane station having a lagoon for receiving seaplanes comprising in combination; cylindrical wind rotors supported by the forward end of the station arranged to propel the station in a forward direction, and means supported above the station rearwardly of the cylindrical wind rotors actuated by the movement of the wind for angularly displacing the fore and aft axis of the station with respect to the axis of the wind during the forward travel of the station whereby the prow of the station may be headed squarely into the swell of the sea independently of the direction of the wind.

6. A hydro-airplane station, comprising in combination; a plurality of buoyant hulls, members holding the hulls in spaced relation whereby a lagoon is formed therebetween, a gangway supported by one of the spacing members having the ends thereof extending between the hulls, a stairway leading from a mid portion of the gangway to a float in the lagoon, and brows connecting each end of the gangway and the hull.

7. A hydro-airplane station, comprising in combination; a plurality of buoyant hulls, members holding the hulls in spaced relation whereby a lagoon is formed therebetween, universally jointed members joining the hulls and the spaced members, a gangway supported by one of the spacing members having the ends thereof extending between the hulls, a stairway leading from the gangway to a float in the lagoon, and brows connecting each end of the gangway and a hull.

In testimony whereof, PAUL GERLI has signed his name to this specification this 1st day of July, 1927.

PAUL GERLI.